United States Patent Office 2,816,892
Patented Dec. 17, 1957

2,816,892

PYRIDAZINESULFONAMIDES

Richard William Young, Riverside, and James W. Clapp, Darien, Conn., assignors to American Cyanamid Company, New York, N. Y., a corporation of Maine No Drawing. Application August 24, 1956
Serial No. 605,928

10 Claims. (Cl. 260—250)

This invention relates to new organic compounds and more particularly is concerned with novel pyridazinesulfonamides which may be represented by the following general formula:

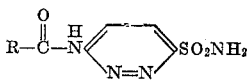

wherein R is a lower alkyl radical such as methyl, ethyl, propyl, isopropyl, butyl, pentyl, amyl, hexyl, etc.

The compounds of this invention are excellent natriuretic agents, that is agents which enhance the excretion of sodium in the urine without necessarily changing the normal volume of urine excreted. The compounds may be administered orally and have been found to be effective in dosages of from 25 mg. to 100 mg. per kilogram of body weight.

The novel compounds may be prepared by chlorinating an appropriate acylamidobenzylmercaptopyridazine to form the corresponding sulfonylchloride derivative. The chlorination reaction may be accomplished smoothly and in good yield by passing chlorine gas through either a suspension or a solution of the acylamidobenzylmercaptopyridazine in a suitable acid. The resulting sulfonylchloride is then converted to the corresponding sulfonamide by treatment with liquid ammonia or ammonium hydroxide, filtering, acidifying with an appropriate mineral acid and the product may be purified by recrystallization in a standard manner. Suitable acids for the chlorination reaction are glacial acetic acid, propionic acid, butyric acid, hydrochloric acid, etc. The temperature of the chlorination reaction is preferably from about 0° to 30° C. The amidation of the sulfonylchloride to the final product is preferably carried out by treatment with an excess of liquid ammonia or ammonium hydroxide for a period varying from about 15 minutes to about 2 hours, the excess ammonia being then removed by evaporation and the final product is separated and purified by recrystallization.

The 3-amino-6-benzylmercaptopyridazine, which is used as the starting material for the preparation of the pyridazinesulfonamides of this invention, is preferably prepared by the reaction of benzylmercaptan and 3-amino-6-chloropyridazine. This reaction is carried out in the presence of a lower alkoxide in alcohol. The 3-amino-6-benzylmercaptopyridazine so produced is then converted to the corresponding acylamido derivative by reaction with either a lower alkanoic anhydride, such as acetic anhydride, propionic anhydride, butyric anhydride, isobutyric anhydride, caproic anhydride, etc. or a suitable acid chloride such as acetyl chloride, propionyl chloride, etc. This acylation reaction is preferably carried out by dissolving the 3-amino-6-benzylmercaptopyridazine in the organic acid, corresponding to the anhydride used, adding the appropriate alkanoic anhydride and heating the mixture to reflux temperatures. The 3-acylamido-6-benzylmercaptopyridazine so obtained is then converted to the corresponding sulfonylchloride and finally to the sulfonamide derivative as outlined hereinabove.

The process by which the novel compounds of this invention may be prepared is illustrated schematically below using 3-acetamido-6-benzylmercaptopyridazine as an example of a suitable acylamidopyridazine.

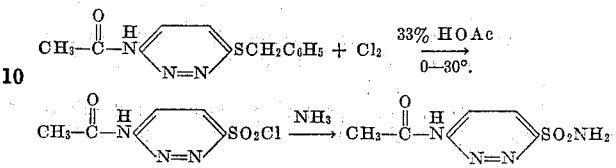

The invention will be described in greater detail in conjunction with the following specific examples in which the parts are by weight unless otherwise specified.

Example 1

Twenty-four parts of 3-acetamido-6-benzylmercaptopyridazine (prepared by reacting 3-amino-6-benzylmercaptopyridazine with acetic anhydride in the presence of acetic acid under reflux conditions) are slurried in 500 parts of 33% acetic acid. For 2 hours while the chlorine is introduced, the slurry is stirred and is cooled to 5° C. by an ice-methanol bath. The sulfonylchloride is filtered off, washed well with cold water and dried in vacuo over potassium hydroxide for 1 hour. The sulfonylchloride is added to 200 parts of liquid ammonia under a stream of nitrogen. The residue obtained partially dissolves in 150 parts of water and complete solution occurs after the addition of 10 parts of 1 N NaOH. The insoluble material is filtered off and the filtrate is treated with Darco and is neutralized with 1:3 HCl to give 12 parts of sulfonamide. The combined solids are recrystallized from 95% alcohol (Norit A) to give a total of 8.8 parts (44%), M. P. 246–247°, of 6-acetamidopyridazine-3-sulfonamide.

Example 2

The procedure of the preceding example is followed with the exception that an equivalent quantity of 3-propionylamido-6-benzylmercaptopyridazine is used. 6-propionylamidopyridazine-3-sulfonamide is produced.

Example 3

The procedure of Example 1 is followed except that an equivalent quantity of 3-butyrylamido-6-benzylmercaptopyridazine is used. 6-butyrylamidopyridazine-3-sulfonamide is produced.

Example 4

The procedure of the preceding example is used with the exception that 3-isobutyrylamido-6-benzylmercaptopyridazine is used. 6-isobutyrylamidopyridazine-3-sulfonamide is produced.

We claim:
1. Pyridazinesulfonamides of the formula:

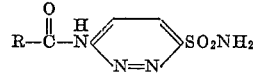

wherein R is a lower alkyl radical.
2. 6-acetamidopyridazine-3-sulfonamide.
3. 6-propionylamidopyridazine-3-sulfonamide.
4. 6-butyrylamidopyridazine-3-sulfonamide.
5. 6-isobutyrylamidopyridazine-3-sulfonamide.
6. The method of preparing pyridazinesulfonamides of the formula:

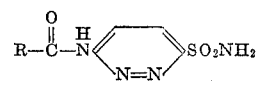

wherein R is a lower alkyl radical which comprises chlorinating a 3-acylamido-6-benzylmercaptopyridazine of the formula:

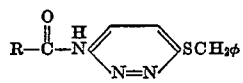

wherein R has the same meaning as above, to obtain the corresponding sulfonylchloride and then reacting the sulfonylchloride derivative with ammonia.

7. The method of preparing 6-acetamidopyridazine-3-sulfonamide which comprises chlorinating 3-acetamido-6-benzylmercaptopyridazine to obtain the corresponding sulfonylchloride and then reacting the sulfonylchloride derivative with ammonia.

8. The method of preparing 6-propionylamidopyridazine-3-sulfonamide which comprises chlorinating 3-propionylamido-6-benzylmercaptopyridazine to obtain the corresponding sulfonylchloride and then reacting the sulfonylchloride derivative with ammonia.

9. The method of preparing 6-butyrylamidopyridazine-3-sulfonamide which comprises chlorinating 3-butyrylamido-6-benzylmercaptopyridazine to obtain the corresponding sulfonylchloride and then reacting the sulfonylchloride derivative with ammonia.

10. The method of preparing 6-isobutyrylamidopyridazine-3-sulfonamide which comprises chlorinating 3-isobutyrylamido-6-benzylmercaptopyridazine to obtain the corresponding sulfonylchloride and then reacting the sulfonylchloride derivative with ammonia.

No references cited.